(12) United States Patent
DiCarlo et al.

(10) Patent No.: US 7,924,310 B1
(45) Date of Patent: Apr. 12, 2011

(54) IMAGE DATA PROCESSING METHODS, IMAGE DATA PROCESSING SYSTEMS, AND ARTICLES OF MANUFACTURE

(75) Inventors: Jeffrey M. DiCarlo, Menlo Park, CA (US); Gary Dispoto, Mountain View, CA (US); Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1351 days.

(21) Appl. No.: 11/444,938

(22) Filed: May 31, 2006

(51) Int. Cl.
*H04N 7/18* (2006.01)
*G06K 9/00* (2006.01)
(52) U.S. Cl. ......................... 348/144; 382/162
(58) Field of Classification Search .................. 348/144, 348/36; 382/162, 274; 345/426; 352/38
See application file for complete search history.

(56) References Cited

U.S. PATENT DOCUMENTS

| | | | |
|---|---|---|---|
| 5,508,734 A * | 4/1996 | Baker et al. ..................... 348/36 |
| 5,548,398 A | 8/1996 | Gaboury | |
| 6,069,972 A | 5/2000 | Durg et al. | |
| 6,597,451 B1 | 7/2003 | Araki | |
| 6,839,088 B2 | 1/2005 | Dicarlo et al. | |
| 7,218,776 B2 * | 5/2007 | Sowinski et al. ............. 382/162 |
| 7,542,621 B2 * | 6/2009 | Prigent ......................... 382/274 |
| 7,710,418 B2 * | 5/2010 | Fairclough .................... 345/426 |
| 2002/0159066 A1 | 10/2002 | Berstis | |
| 2002/0171842 A1 | 11/2002 | Dicarlo et al. | |
| 2004/0095561 A1 | 5/2004 | McDowell | |
| 2004/0105264 A1 | 6/2004 | Spero | |
| 2005/0083293 A1 | 4/2005 | Dixon | |
| 2005/0219364 A1 | 10/2005 | Dicarlo | |
| 2006/0215115 A1 * | 9/2006 | Long et al. ..................... 352/38 |

OTHER PUBLICATIONS

U.S. Appl. No. 11/054,193, filed Feb. 28, 2005; "Imaging Device, Analysis Methods, Imaging Device Analysis Systems, and Articles of Manufacture"; DiCarlo et al.
"Ambient Light Analysis Methods, Imaging Devices, and Articles of Manufacture"; DiCarlo et al.; filed concurrently.

* cited by examiner

*Primary Examiner* — Gims S Philippe

(57) ABSTRACT

Image data processing methods, image data processing systems, and articles of manufacture are described. According to one aspect, an image data processing method includes accessing initial image data of a first image representation of a scene, selecting one of a plurality of imaging conditions, wherein the selected one of the imaging conditions is different than an initial one of the imaging conditions used to generate the initial image data, and processing the initial image data using the selected one of the imaging conditions to provide processed image data of a second image representation of the scene different from the first image representation of the scene, wherein the second image representation of the scene represents the scene as if it were captured according to the selected one of the imaging conditions.

20 Claims, 3 Drawing Sheets

US 7,924,310 B1

IMAGE DATA PROCESSING METHODS, IMAGE DATA PROCESSING SYSTEMS, AND ARTICLES OF MANUFACTURE

FIELD OF THE DISCLOSURE

Aspects of the disclosure relate to image data processing methods, image data processing systems, and articles of manufacture.

BACKGROUND

Consumer and professional photographers may manipulate scene settings and conditions in attempts to render images which provide desired representations of the scenes. For example, artificial lighting such as flashes may be used to change lighting conditions of the scene or photographs may be taken at certain parts of the day depending upon the photographer's preference.

More recently, digital cameras have gained acceptance and usage by both consumer and professional photographers. Although the popularity and sophistication of digital cameras continue to increase, some photographers may be reluctant to transition from film cameras to digital cameras because of their familiarity with film based cameras. For example, a photographer may have a preference for a certain type of film knowing what the results will be and how the resultant prints will turn out before photographs are taken.

At least some aspects of the disclosure provide apparatus and methods which offer increased flexibility for processing image data.

SUMMARY

According to some aspects, exemplary image data processing methods, image data processing systems, and articles of manufacture are described.

According to one embodiment, an image data processing method comprises accessing initial image data of a first image representation of a scene, selecting one of a plurality of imaging conditions, wherein the selected one of the imaging conditions is different than an initial one of the imaging conditions used to generate the initial image data, and processing the initial image data using the selected one of the imaging conditions to provide processed image data of a second image representation of the scene different from the first image representation of the scene, wherein the second image representation of the scene represents the scene as if it were captured according to the selected one of the imaging conditions.

According to another embodiment, an article of manufacture comprises media configured to store programming configured to cause processing circuitry to perform processing comprising accessing initial image data of a scene captured according to a first imaging condition, accessing information regarding a second imaging condition different than the first imaging condition, and providing conversion data configured to convert the initial image data to processed image data different than the initial image data and which represents the scene captured according to the second imaging condition.

Other aspects are described as is apparent from the following disclosure.

DETAILED DESCRIPTION

At least some aspects of the disclosure are directed to apparatus and methods which offer a user increased flexibility over the processing of image data. For example, a user may synthesize different color renderings of a scene captured with an imaging device. In more specific examples, settings may be offered which permit a user to emulate a desired film and/or relight a scene as if it was illuminated by a different illuminant.

Figure 1:
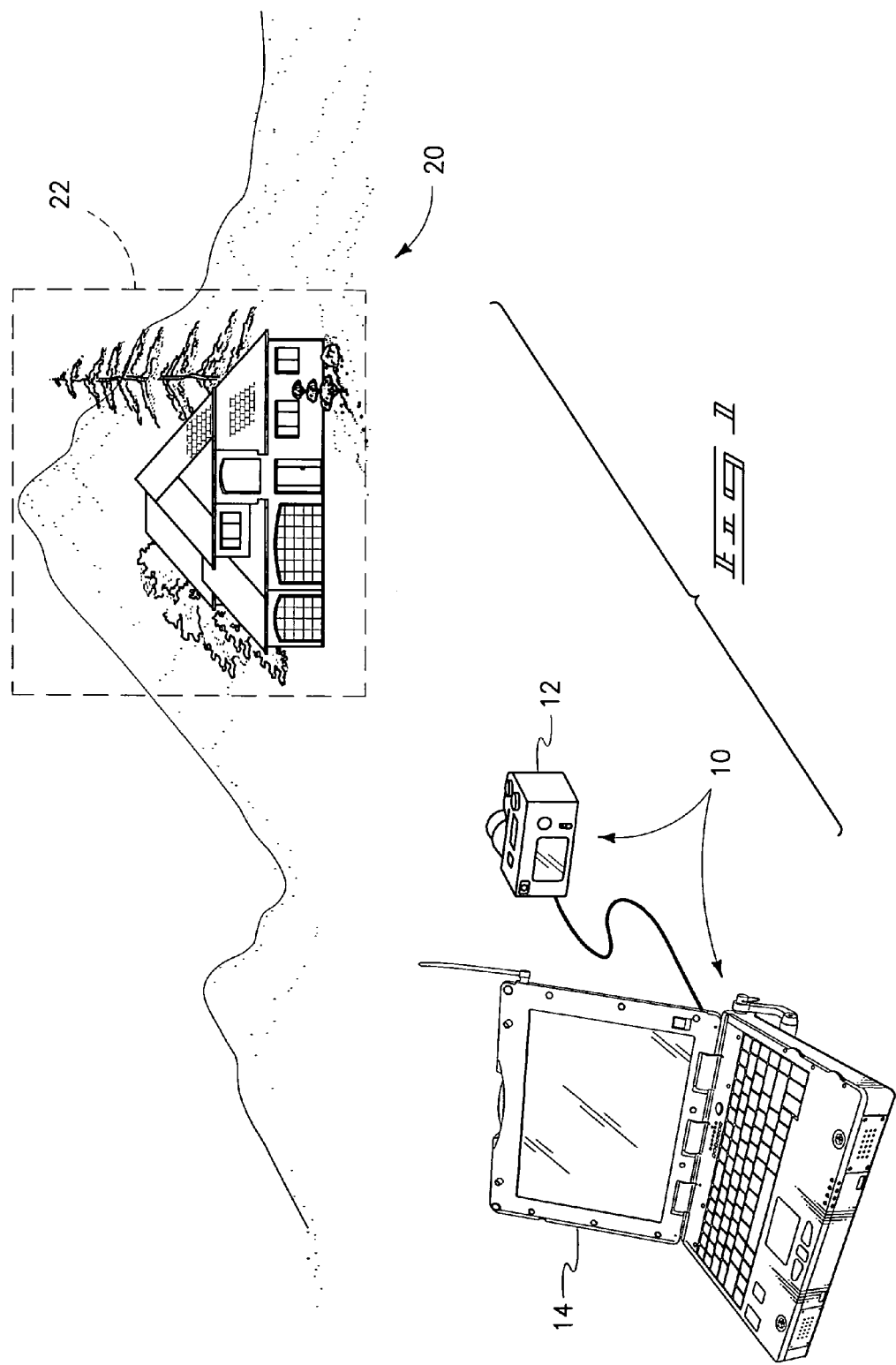
FIG. 1 is an illustrative representation of an imaging system in an exemplary scene according to one embodiment.

Referring to FIG. 1, an imaging system 10 is depicted with respect to an exemplary scene 20 (e.g., outdoors in the example of FIG. 1). Imaging system 10 includes an imaging device 12 and a computing device 14 in the exemplary illustrated embodiment. In one configuration, imaging device 12 may include a digital camera 14 configured to generate digital image data for representing a portion 22 of scene 20 in an image. Computing device 14 may include any suitable apparatus (e.g., personal computer) configured to process image data generated by imaging device 12.

According to one embodiment, aspects of the disclosure are distributed between imaging device 12 and computing device 14. Other arrangements of imaging system 10 are possible. For example, in some embodiments of imaging system 10, imaging device 12 or computing device 14 may be omitted, and aspects of the disclosure may be implemented entirely within imaging device 12 or computing device 14. Imaging device 12 may also be configured as a film based camera in other embodiments and prints may be scanned yielding respective digital image data for processing. Other devices (not shown) may also be included in system 10 in other embodiments.

Figure 2:
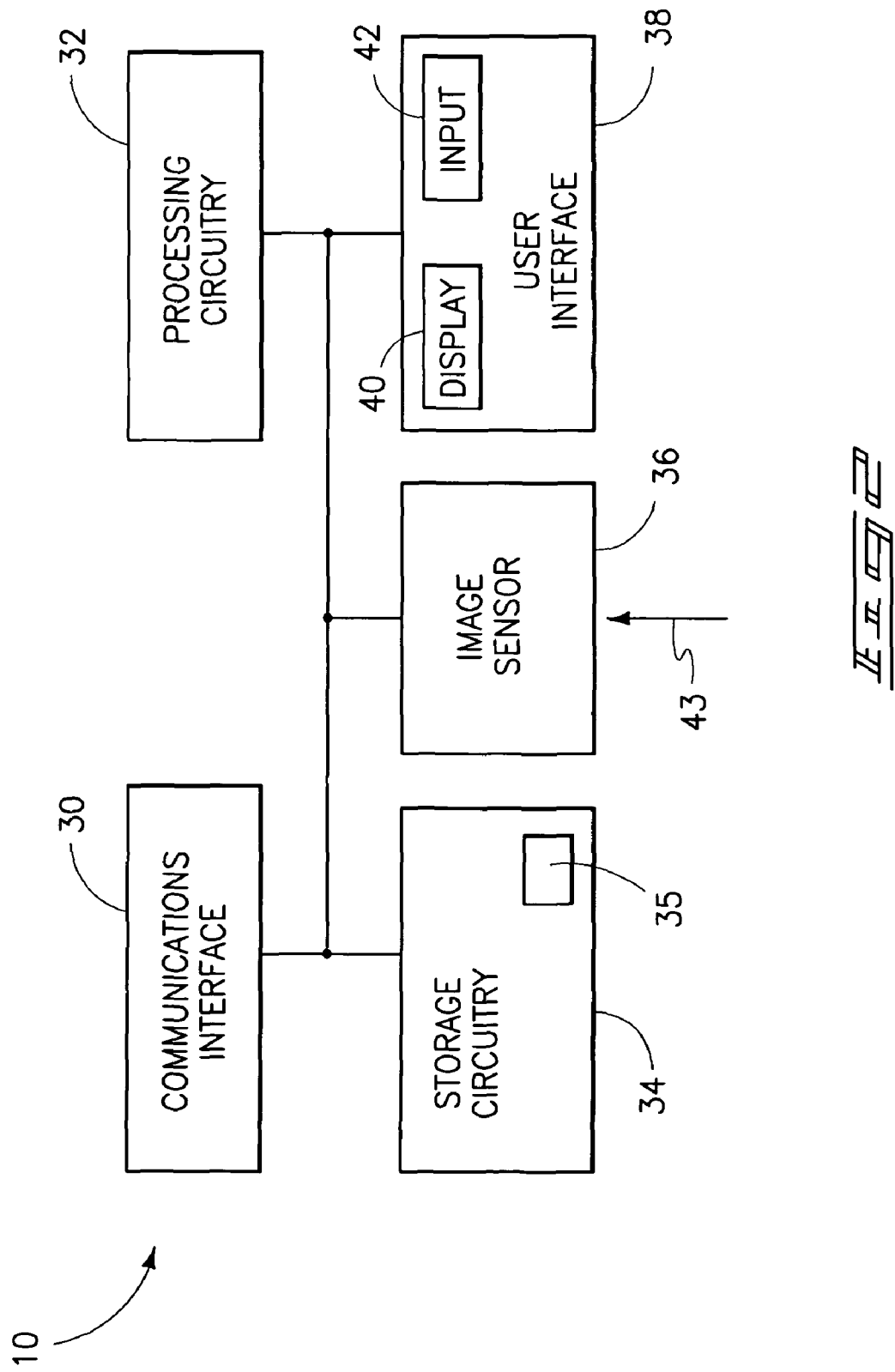
FIG. 2 is a functional block diagram of an imaging system according to one embodiment.

Referring to FIG. 2, components of but one possible implementation of imaging system 10 are shown. Imaging system 10 may include a communications interface 30, processing circuitry 32, storage circuitry 34, an image sensor 36 and a user interface 38. Other configurations are possible, and may include more, less and/or alternative components. Also, some of the illustrated components may be individually entirely implemented within one of imaging device 12 and computing device 14, or distributed between the devices 12, 14. For example, image sensor 36 may be provided by imaging device 12 while both devices 12, 14 may include respective processing circuitry 32, storage circuitry 34, and/or user interfaces 38 in one embodiment. At least some aspects disclose image data processing operations as discussed below. One or both of devices 12, 14 may be configured to implement image data processing operations (e.g., determining conversion data (described below) and/or processing image data using the conversion data) and devices 12, 14 may be individually referred to as an image data processing system.

Communications interface 30 is configured to implement communications intermediate of imaging device 12 and computing device 14 of imaging system 10 and/or with respect to external devices. For example, if imaging system 10 includes a computing device 14, a communications interface 30 of computing device 14 may be used to access image data generated by an appropriate source, such as imaging device 12, a scanner in film based applications (not shown), or any other source of image data to be processed (not shown). Exemplary configurations of communications interface 30 include a USB port, serial or parallel connection, IR interface, wireless interface, or any other arrangement capable of uni or bi-directional communications. Communications interface 30 may be configured to communicate or exchange any appropriate data.

Processing circuitry 32 may be configured to process image data according to aspects described below within one or both of imaging device 12 and/or computing device 14. Processing circuitry 32 may additionally be utilized to control operations of imaging system 10 (e.g.; image capture operations, user interface operations, control optics, etc.). In one embodiment, processing circuitry 32 may comprise circuitry configured to implement desired programming. For example, processing circuitry 32 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 32 are for illustration and other configurations are possible.

Storage circuitry 34 is configured to store electronic data (e.g., image data, databases discussed below, etc.) and/or programming such as executable instructions (e.g., software and/or firmware), or other digital information. Storage circuitry 34 may comprise processor-usable media which may include an article of manufacture 35 which can contain, store, or maintain programming, data and/or digital information for use by or in connection with an instruction execution system including processing circuitry 32 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Image sensor 36 is configured to provide image data of a plurality of images responsive to received photons of light 43 of desired portions 22 of scenes 20. For example, the image data may comprise bytes corresponding to the colors of red, green and blue at respective pixels of sensor 36 in an exemplary RGB application (e.g., using a Bayer mosaic filtering pattern to provide respective pixels for red, green and blue information). Other embodiments may provide other color information. Image sensor 36 may comprise a plurality of photosensitive elements, such as photodiodes, corresponding to the pixels and configured to provide digital data usable for generating images. For example, image sensor 36 may comprise a raster of photosensitive elements (also referred to as pixel elements) arranged in 1600 columns by 1280 rows in one, possible configuration. Other raster configurations are possible. The photosensitive elements may comprise charge coupled devices (CCDs) or CMOS devices in exemplary configurations. Image sensor 36 may be internal of imaging device 12 in digital camera embodiments, or embodied in a scanner for scanning film prints in other embodiments.

User interface 38 is configured to interact with a user and may convey data to a user (e.g., displaying images or other data for observation by the user, audibly communicating data to a user, etc.) as well as receiving inputs from the user (e.g., tactile input, etc.). Accordingly, in one exemplary embodiment, the user interface 40 may include a display 40 (e.g., LCD, etc.) configured to depict visual information and an input device 42 (e.g., keyboard and/or mouse). Any other suitable apparatus for interacting with a user may also be utilized. A user may utilize user interface 40 to select desired imaging conditions, such as desired ambient illumination and/or film type, as discussed in further detail below.

According to some embodiments, responsivity and transduction functions of imaging device 12 (and/or of other imaging devices used to generate initial image data) are provided for use in processing of image data generated by the respective image device(s). For example, exemplary apparatus and/or methods for determining responsivity and transduction functions of imaging devices are described in a U.S. patent application entitled "Imaging Device Calibration Methods, Imaging Device Calibration Instruments, Imaging Devices, And Articles Of Manufacture", having Ser. No. 10/818,622, filed Apr. 5, 2004, now U.S. Patent Publication No. 2005/0219364 A1, naming Jeffrey M. DiCarlo as inventor; and a U.S. patent application entitled "Imaging Device Analysis Methods, Imaging Device Analysis Systems, And Articles Of Manufacture", having Ser. No. 11/054,193, filed Feb. 8, 2005, naming Jeffrey M. DiCarlo and Casey Miller as inventors, and the teachings of both applications are incorporated herein by reference.

Also, other information to assist with processing of image data may be provided or accessed. For example, databases of surface reflectance functions of various surfaces, and characterizations of films and/or ambient (scene) illuminants may be provided. Film characterizations including responsivity and transduction functions of different films may be accessed from manufacturers of the films, measured (e.g., using a spectrophotometer and/or a monochromater), or otherwise ascertained. Characterizations of ambient illuminants including spectral power distributions of ambient illuminations at scenes 20 may be measured using a spectrophotometer or aspects described in a U.S. patent application entitled "Ambient Light Analysis Methods, Imaging Devices, And Articles Of Manufacture", naming Jeffrey M. DiCarlo and Casey Miller as inventors, filed the same day as the present application and the teachings of which are incorporated herein by reference. In addition, a database of spectral power distributions of common ambient illuminations may also be provided.

In one embodiment, responsivity and transduction functions of imaging devices and/or film, surface reflectance functions, and spectral power distributions of ambient illuminations may be stored within storage circuitry 34 for use by processing circuitry 32 to compute desired scene syntheses. During exemplary image data processing as discussed further below with respect to illustrative embodiments, new color correction matrices or color transforms may be computed based upon the responsivity and transduction functions of the respective imaging device 12 used to capture the image data, the ambient illumination at scene 20, the ambient illumination to be synthesized and/or responsivity and transduction functions of film types to be synthesized. Thereafter, the new color correction matrices or color transforms may be applied to image data to provide processed image data which may be indicative of the synthesized scene (i.e., as if captured in the presence of the ambient illumination and/or using a specific film). New color correction matrices or color transforms may be computed when new film types and/or ambient illuminations are selected for simulation (e.g., by a user).

Aspects of exemplary processing of image data which may be performed by processing circuitry 32 are described below. Image data of a scene 20 generated by imaging device 12 may be referred to as initial image data for providing a first representation of the scene (e.g., a representation without the exemplary processing described below to simulate film types and/or ambient illuminants). Initial image data may also be provided differently in other embodiments. For example, imaging device 12 may generate the initial image data or a film print may be scanned or otherwise digitized to provide initial image data of the scene 20. The initial image data may be processed or converted in various manners as described below to provide processed image data for providing a second representation of the scene (e.g., a representation as if the initial image data of the scene 20 were obtained using a desired film and/or ambient illumination not present during generation of the initial image data).

The initial image data may be generated according to imaging conditions or characteristics associated with the capture of the image data. For example, the initial image data may be generated in the presence of the conditions including imaging device 12 configured as a digital camera without the use of film and in the presence of the specific ambient illumination present during image capture. Other conditions may include scanning of film prints captured in the presence of ambient illumination. A user may desire to select one or more imaging condition for rendering of the initial image data which are different from the respective imaging conditions when the initial image data was generated. For example, the user may wish to generate images as if the scene 20 were captured using other imaging conditions apart from those present when the initial image data was generated. In exemplary embodiments, a user may specify a specific film type (e.g., a specific speed of film for a specific manufacturer) and/or the presence of a specific ambient illumination. The desired film type and/or ambient illumination may be selected in other ways in other embodiments. Following selection of one or more different imaging condition, the processing circuitry 32 may process the initial image data using the selected different imaging condition(s) to provide conversion data which may be used to provide processed image data from initial image data.

Equation A shows an image formation equation which describes how a surface and illuminant produce a linear camera response based on the responsivity functions of the camera:

$$C_{m,n}^L = \int_\lambda r_m(\lambda)e(\lambda)s_n(\lambda)d\lambda \text{ for } \begin{array}{l} m = 1 \ldots N_{sensors} \\ n = 1 \ldots N_{surfaces} \end{array}$$ Eqn. A where $s_n(\lambda)=n^{th}$ surface reflectance function; $e(\lambda)$=ambient illuminant spectral power distribution; $r_m(\lambda)=m^{th}$ camera sensor responsivity function; and $C_{m,n}^L$=linear camera response from the $m^{th}$ sensor for the $n^{th}$ surface.

The linear camera responses may also be transformed using a separate non-linear function for each color channel (e.g., red, green, blue) which provides the raw output of the camera. Equation B shows an exemplary non-linear function:

$$C_{m,n}^O = f_m(C_{m,n}^L)$$ Eqn. B where $f_m$=the non-linear function for the $m^{th}$ color channel; $C_{m,n}^L$=Linear camera response from the $m^{th}$ sensor for the $n^{th}$ surface; and $C_{m,n}^O$=raw camera output response from the $m^{th}$ sensor for the $n^{th}$ surface.

The image formation equation may also be compactly written in matrix notation wherein each spectral function may be sampled at equally-spaced wavelengths. For example, $e=[e(\lambda_1)\Delta\lambda.e(\lambda_2)\Delta\lambda \ldots e(\lambda_{Nwave})\Delta\lambda]^T$ and the image formation equation is shown in Equation C:

$$C^L = R^T \text{diag}(e)S$$ Eqn. C wherein S=surface reflectance functions (each column is a separate surface); e=ambient illuminant spectral power distribution; R=camera responsivity functions (each column represents the function for a different color sensor); diag is a function that places the vector along the diagonal of a zeros matrix; and $C^L$=linear camera responses (the matrix element $C_{i}$ is the $m^{th}$ camera sensor response to the $n^{th}$ surface). Eqn. C may be used to determine conversion data for use in converting the initial image data to processed image data as discussed below with respect to Eqn. E in one embodiment.

The transduction function may be represented in matrix notation as shown in Equation D:

$$C^O = f(C^L)$$ Eqn. D where $C^L$=linear camera responses; f is the non-linear function for each color channel and the number of inputs and outputs is $N_{sensors}$; and $C^O$=raw camera output responses.

Aspects of determining conversion data for processing and image data processing by processing circuitry 32 are described below according to exemplary aspects for synthesizing film and/or ambient illumination. For simulation of a desired film type, a camera linear response ($C_{film}^L$) for the particular desired film may be determined using Eqn. C where typical surface reflectance functions may be assumed (e.g., accessed using a database), and the spectral power distribution of the ambient illuminant may be specified (e.g., the same as the ambient illumination in which the image data being processed was captured). The responsivity function of the film and transduction function of the film ($f_{film}$) may be determined using aspects of the above-described incorporated patent applications, provided by the manufacturer of the film, or otherwise obtained.

Thereafter, a camera linear response for imaging device 12 ($C_{digital}^L$) which captured the initial image data may be determined using Eqn. C and the same surface reflectance functions and spectral power distribution of the ambient illumination as used to determine the camera linear response for the desired film. The responsivity functions of imaging device 12 may be determined, for example, as discussed in the patent applications incorporated by reference above for use in Eqn. C. The transduction function of the imaging device 12 ($f_{digital}$) may also be determined for example using exemplary aspects of the above-incorporated patent applications.

Using $C_{film}^L$, $f_{film}$, $C_{digital}^L$, and $f_{digital}$, the measured camera response (mcr) (i.e., the initial image data) may be transformed to simulate the film response (sfr) also referred to as processed image data using Equation E:

$$\text{sfr} = f_{film}\{C_{film}^L \text{pinv}(C_{digital}^L)f_{digital}^{-1}(\text{mcr})\}$$ Eqn. E where pinv(x) denotes the pseudo-inverse of x.

For simulation of ambient illumination, the above described process may be repeated by the processing circuitry 32 with respect to Eqn. E except $f_{film}$ replaced by $f_{digital}$ and $C_{film}^L$ is replaced by $C_{digital\_newilluminant}^L$, where $C_{digital\_newilluminant}^L$ represents the camera linear responses using the desired new ambient illumination as selected, for example by the user. $C_{digital\_newilluminant}^L$ may be calculated using Eqn. C using the same surface reflectance functions as used to determine $C_{digital}^L$, the responsivity functions of imaging device 12, and the spectral power distribution of the ambient illumination to be simulated. For simulation of film type and ambient illumination, the above described process described with respect to simulating a film may be repeated by the processing circuitry 32 with respect to Eqn. E except $C_{film}^L$ is replaced by $C_{film\_newilluminant}^L$, where $C_{film\_newilluminant}^L$, represents the film response using the new illuminant. $C_{film\_newilluminant}^L$ may be calculated using Eqn. C using the same surface reflectance functions as used to determine $C_{digital}^L$, the responsivity functions of the film to be simulated, and the spectral power distribution of the ambient illumination to be simulated.

Using Eqn. E according to one embodiment, the processing circuitry processes the initial image data to remove modifications to the initial image data inherently provided by the imaging device 12 or other source of the initial image data. For example, the pseudoinverse of the camera response of the imaging device 12 may be used to provide unmodified data (i.e., data which does not have modifications provided to the image data inherently by the operation of the imaging device 12). Once the image data is provided in the unmodified state, the selected imaging condition(s) may be applied to the unmodified image data to provide the processed image data. For example, the conversion data may be determined responsive to the selected imaging condition(s) to be simulated and used to convert the unmodified data to the processed data. With respect to the example where films are simulated, the conversion data may include $C_{film}^L$ to perform the conversion of the image data. $C_{film}^L$, $\text{pinv}(C_{digital}^L)$ and/or a combination of both may be referred to as new color correction matrices. In addition, the transduction function of film ($f_{film}$) may also be used to provide a linear response.

Figure 3:
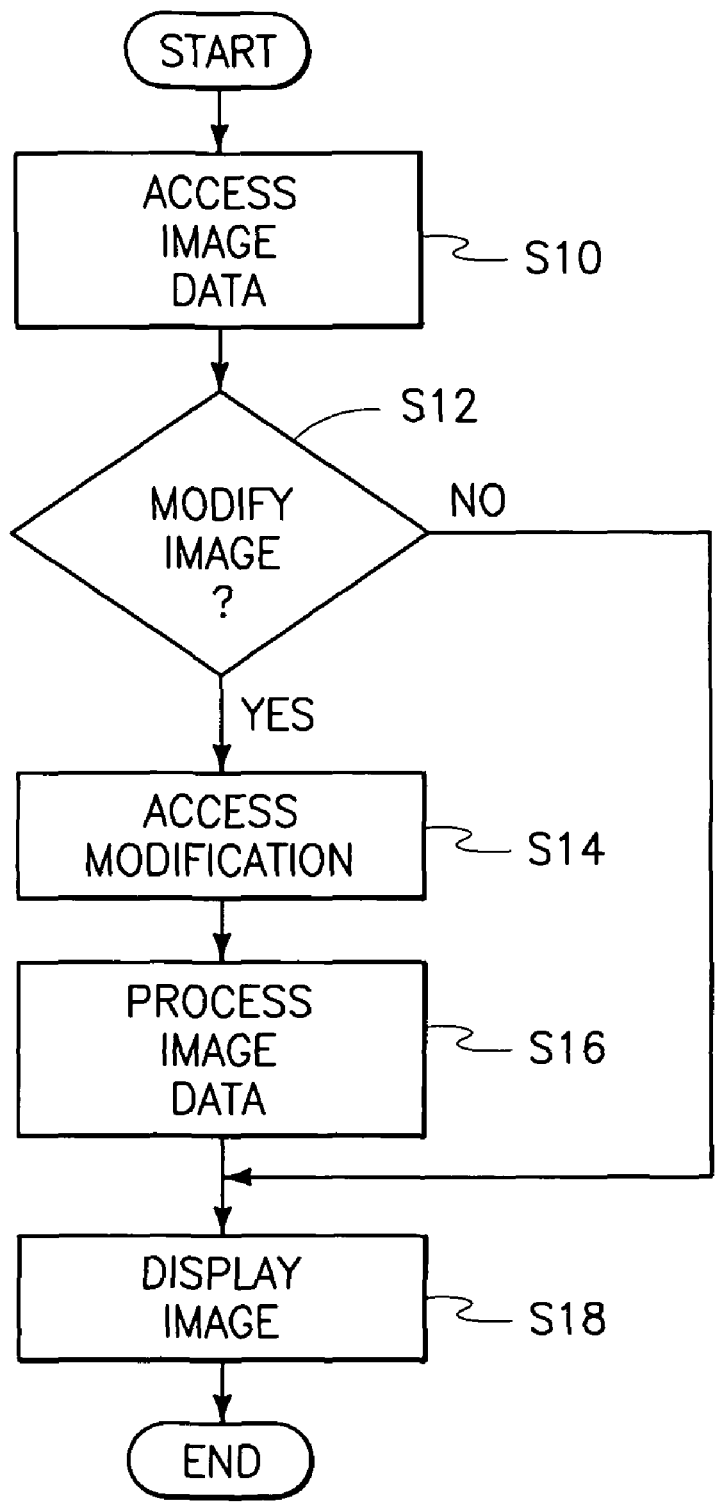
FIG. 3 is a flow chart of an exemplary method of processing image data according to one embodiment.

Referring to FIG. 3, an exemplary method is shown for determining conversion data and for converting initial image data using the conversion data to simulate a film and/or ambient illumination. The depicted method may be performed by processing circuitry 32 in one implementation. Other methods including more, less or alternative steps are possible in other embodiments.

At a step S10, the initial image data provided by an imaging device is accessed. The accessing may include accessing the initial image data from storage circuitry of the imaging device if the appropriate processing circuitry performing the method is within the imaging device. In another embodiment, a file of the initial image data may be provided to processing circuitry of a computing device. Other methods are possible for accessing the initial image data to be processed.

At a step S12, it is determined whether processing to simulate a desired different imaging condition (e.g., film and/or ambient illumination) is to be performed. For example, a user may indicate the simulation to be performed via a user interface. A user may select the film and/or ambient illumination before or after the generation of the initial image data.

If no processing is to be performed, the initial image data may be displayed at a step S18. Otherwise, at a step S14, the desired modification is accessed by the processing circuitry. For example, if a film is to be simulated, the processing circuitry may access information such as the appropriate surface reflectance functions, the spectral power distribution of the ambient illumination existing when the image data was generated, and the responsivity and transduction functions of the imaging device and the film to be simulated. If an ambient illumination is to be simulated, the processing circuitry may access the same surface reflectance functions, the ambient illumination to be simulated and the responsivity and transduction functions of the imaging device. As described above, the information access at step S14 may be used with Eqn. C to determine conversion data as described above.

At a step S16, the processing circuitry processes the initial image data, for example, using the conversion data and Eqn. E in one embodiment. The simulated film and/or ambient illuminate response (i.e., processed image data) is determined by the processing at step S16.

At a step S18, an image may be displayed. If modification is implemented, the image may be displayed using the processed image data to depict the scene as if captured using the selected film and/or ambient illumination. If no modification is made, the image may be displayed using the initial image data. At step S18, the image may be printed or other desired action taken using the processed image data.

At least some aspects of the disclosure facilitate synthesis of different scene or ambient illuminations and/or film types using responsivity and transduction functions of the imaging device which generated the image data being processed. The usage of these functions enables synthesis without utilization of multiple images of a calibration chart illuminated by a set of illuminants for individual imaging devices which may be overly time consuming or impractical. Furthermore, aspects of the disclosure enable synthesis of different film types and/or synthesis of ambient illuminations which were not contained in such an imaged set of multiple images.

Usage of the responsivity and transduction functions of individual imaging devices which captured the respective initial image data permits processing for synthesis of images in software, for example, automatically without user intervention according to at least one aspect. In addition, if a new film type is developed or new ambient illumination determined, a camera vendor may characterize the film or illuminant once (e.g., determine the respective responsivity and transduction functions of the film or the spectral power distribution of the ambient illumination) and download the information, for example via the Internet and communications interfaces 30, to respective imaging systems 10 for use to synthesize the new film type or ambient illumination. Accordingly, at least some imaging systems 10 may be updated periodically to support new film types and/or ambient illuminants, for example through a firmware upgrade, which may be relatively easily performed by a user.

It is believed that exemplary aspects and embodiments of the disclosure may ease the transition of some photographers to digital imaging technologies. For example, users may select a desired film type and/or ambient illuminant to be simulated and resultant images may appear similar to images resulting from the film type and/or ambient illuminant.

The protection sought is not to be limited to the disclosed embodiments, which are given by way of example only, but instead is to be limited only by the scope of the appended claims.

What is claimed is:

1. An image data processing method comprising:
 accessing initial image data of a first image representation of a scene;
 selecting one of a plurality of imaging conditions, wherein the selected one of the imaging conditions is different than an initial one of the imaging conditions used to generate the initial image data; and
 processing the initial image data using the selected one of the imaging conditions to provide processed image data of a second image representation of the scene different from the first image representation of the scene, wherein the second image representation of the scene represents the scene as if it were captured according to the selected one of the imaging conditions.

2. The method of claim 1 wherein the selected one of the imaging conditions corresponds to a desired film to be simulated.

3. The method of claim 1 wherein the selected one of the imaging conditions corresponds to a desired ambient illumination to be simulated.

4. The method of claim 1 wherein the selecting comprises selecting before generation of the initial image data.

5. The method of claim 1 wherein the selecting further comprises selecting another of the imaging conditions different than the initial one and the selected one of the imaging conditions, and the processing comprises processing to provide the processed image data using the selected another of the imaging conditions to provide the second image representation which represents the scene as if it were captured according to the selected another of the imaging conditions.

6. The method of claim 5 wherein the one of the imaging conditions corresponds to one of a plurality of different film types and the another of the imaging conditions corresponds to one of a plurality of different ambient illuminations.

7. The method of claim 1 wherein the processing comprises processing using processing circuitry of a digital camera.

8. An image data processing system comprising:
  processing circuitry configured to access initial image data of a scene captured in the presence of one of a plurality of different ambient illuminations, to access information regarding an other of the ambient illuminations different than the one of the ambient illuminations, and to process the initial image data to provide processed image data which represents the scene in the presence of the other of the ambient illuminations.

9. The system of claim 8 further comprising a display, and wherein the processing circuitry is configured to control the display to depict the scene in the presence of the other of the ambient illuminations using the processed image data.

10. The system of claim 8 wherein the processing circuitry comprises processing circuitry of an imaging device configured to generate the initial image data.

11. The system of claim 8 wherein the processing circuitry is configured to access the initial image data comprising digital data generated by an image sensor responsive to reception of photons corresponding to the scene.

12. The system of claim 8 further comprising a user interface configured to receive input from a user to select the other of the ambient illuminations before the generation of the initial image data.

13. The system of claim 8 wherein the processing circuitry is configured to access a selection of one of a plurality of different film types and to process the initial image data according to the one of the film types to provide the processed image data which represents the scene captured using film of the one of the film types.

14. An article of manufacture comprising:
  media configured to store programming configured to cause processing circuitry to perform processing comprising:
    accessing initial image data of a scene captured according to a first imaging condition;
    accessing information regarding a second imaging condition different than the first imaging condition; and
    providing conversion data configured to convert the initial image data to processed image data different than the initial image data and wherein the processed image data represents the scene captured according to the second imaging condition.

15. The article of claim 14 wherein the programming is further configured to cause processing circuitry to perform processing comprising:
  processing the initial image data using the conversion data; and
  providing the processed image data different than the initial image data responsive to the processing.

16. The article of claim 14 wherein the accessing comprises accessing the initial image data comprising digital data generated by an image sensor of a digital camera responsive to reception of photons corresponding to the scene.

17. The article of claim 16 wherein the first imaging condition corresponds to the image sensor and the second imaging condition corresponds to a type of film.

18. The article of claim 14 wherein the second imaging condition corresponds to a type of film.

19. The article of claim 14 wherein the first and second imaging conditions correspond to respective different ambient illuminations.

20. The article of claim 14 wherein the second imaging condition is provided before generation of the initial image data.

* * * * *